United States Patent [19]
Buckman

[11] 3,949,780
[45] Apr. 13, 1976

[54] TWO PIECE CHECK VALVE

[76] Inventor: Thomas P. Buckman, 11561 Shelly Vista Drive, Tujunga, Calif. 91042

[22] Filed: Sept. 19, 1974

[21] Appl. No.: 507,428

[52] U.S. Cl. .............................. 137/525; 137/315
[51] Int. Cl.² ............... F16K 15/00; F16K 17/00; F16K 21/04
[58] Field of Search ............. 137/525, 525.1, 512.4, 137/493, 454.6, 315; 251/148

[56] References Cited
UNITED STATES PATENTS

| | | | |
|---|---|---|---|
| 2,282,987 | 5/1942 | Bennett | 137/525 X |
| 2,329,960 | 9/1943 | Verheul | 137/525 X |
| 2,912,999 | 11/1959 | Kersh | 137/525 X |
| 2,913,000 | 11/1959 | Roberts | 137/525 |
| 2,954,043 | 9/1960 | Canalizo | 137/525 X |
| 3,022,796 | 2/1962 | Cummings | 137/525 X |
| 3,250,219 | 5/1966 | McCarty et al. | 137/525 X |
| R21,323 | 1/1940 | Langdon | 137/525 X |

Primary Examiner—Alan Cohan
Assistant Examiner—Robert J. Miller
Attorney, Agent, or Firm—Witherspoon and Lane

[57] ABSTRACT

A two piece check valve assembly comprising a retainer and a valve assembled thereto, the assembly having primary usage in hydraulic and pneumatic systems operating at a low differential pressure of fractions of ounces to over a hundred pounds per square inch. The check valve assembly comprises a retainer and a valve including a dome-shaped element and is adapted for use in a tubular member wherein the retainer grips the inner face of the tubular wall to position the valve assembly and the dome-shaped element fits against the inner wall of the tubular member. Pressure within the dome element causes it to expand and snugly engage the inner wall of the tubular member to cut off flow.

6 Claims, 5 Drawing Figures

TWO PIECE CHECK VALVE

SUMMARY OF THE INVENTION

This invention relates to check valves and, more particularly, to a two piece check valve assembly operational in the very low pressure area up to a hundred pounds per square inch.

Although there are many check valves on the market today which operate in the low pressure area and also have reasonable range, most of such units have unacceptable accuracy variations.

In view of the above, it is an object of this invention to provide a two piece check valve assembly having very accurate and consistent flow characteristics over a wide range of pressures from very low to moderately high.

It is another object of this invention to provide a check valve assembly having a resilient valve with excellent sealing characteristics including virtually zero leakage in the closed position and further having the unique characteristic that it may be used in any position from upright to inverted.

It is yet another object of this invention to provide a check valve assembly wherein the resilient valve may have wide dimensional tolerances and therefore be capable of economical manufacture.

The above and additional objects and advantages will become more apparent when taken in conjunction with the following detailed description and drawing.

IN THE DRAWINGS

FIG. 1 is a vertical cross sectional view illustrating the two piece check valve assembly, FIG. 2 is a top plan view of the valve assembly of FIG. 1, FIG. 3 is a vertical cross sectional view of the valve assembly of FIG. 1 as it appears when inserted in a tubular member for operation, FIG. 4 is a vertical cross sectional view of a second embodiment of the check valve assembly of this invention, and FIG. 5 is a cross sectional view of another embodiment illustrating a cone-shaped portion in place of the dome-shaped portion in FIG. 2.

DETAILED DESCRIPTION OF THE INVENTION

Figure 1:
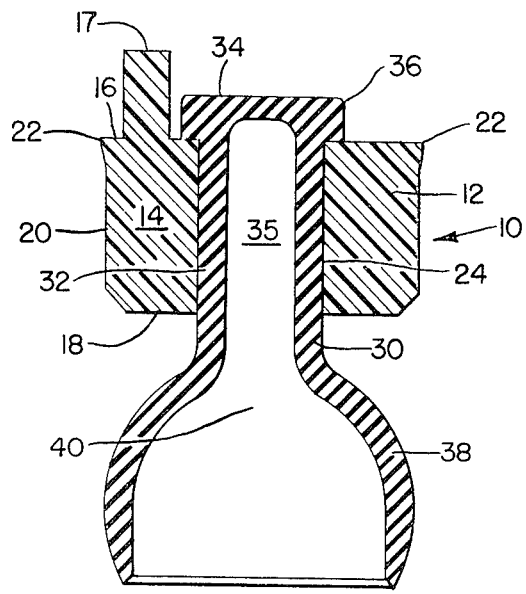
Figure 2:
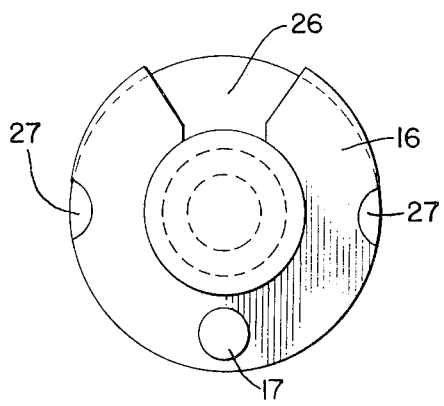

Referring to FIGS. 1 and 2, the check valve assembly 10 comprises a retainer 12 having a cylindrical body 14 with a top 16, a bottom 18 and a vertical side wall 20 connecting the top and bottom. A plurality of resilient barbs 22 extend outwardly from the vertical side wall 20 adjacent the body top 18. The body 14 is provided with a vertical hole 24 on its longitudinal axis, said hole extending completely through the body. An arcuate opening 26 is formed in the vertical side portion of the body. Such opening connects with the vertical hole 24 which receives the valve in a manner to be described later.

The resilient valve 30 comprises a hollow cylindrical body 32 having a cap 34 on the top end thereof closing off body opening 35. The body 32 is sized to snugly fit in retainer body hole 26 with the cap 34 having an outwardly extending flange 36 which extends over and engages the top 16 of the body 14. The lower and open portion of the cylindrical body 32 is connected to a dome-shaped member 38 having its open face directed downwardly. The dome portion is provided with an aperture 40 sized to correspond with body opening 35 and in alignment therewith. The dome shaped member 38 is sized to fit within and to engage the inner wall of the tubular member carrying the valve assembly 10.

Figure 3:
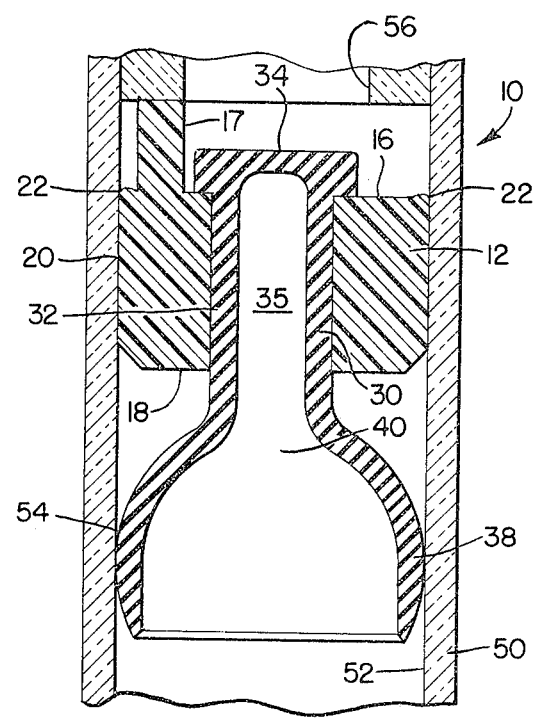

The valve 30 is assembled with the retainer 12 by introducing the body 32 of the valve element into the arcuate opening 26 in the retainer body 12 and moving the valve body further in until it is seated snugly in the vertical hole 24 in the retainer body 12. Referring to FIG. 3, the valve assembly 10 is inserted in tubular member 50 with the open face of the dome 38 facing downwardly and in engagement with the inner wall 52 of tubular member 50. The retainer side wall 20 and retaining barbs 22 engage the inner wall 52 to securely position the check valve assembly 10 in the tubular member 50.

In use, fluid will flow downwardly in the tubular member 50 through arcuate opening 26 and then pass between the inner wall 52 and the outer surface 54 of the dome member 38 which will flex inwardly to allow the fluid to pass thereby. Increase of pressure on the downward side of the dome member 38 will cause the dome to expand and engage the inner wall 52 and then stop flow of fluid therepast. It should also be noted that pressure will be exerted outwardly on the valve body 32 to cause it to expand and firmly bear against retainer hole wall 24. In the event that additional flow is desired through retainer 12 peripheral longitudinal holes 27 may be formed in the retainer side portion.

Figure 4:
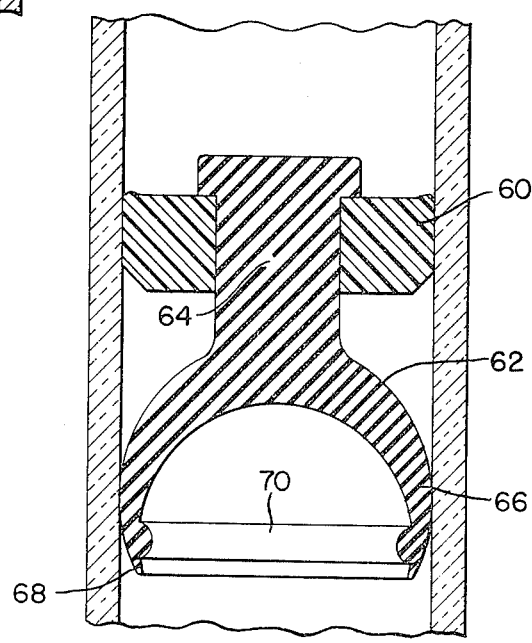

The embodiment in FIG. 4 is quite similar to that of FIG. 3, and comprises a retainer 60 of the same type as in the embodiment of FIG. 1 and a valve 62 similar to the valve 30 of FIG. 1 except that the valve body 64 in valve 62 is solid. The lower end of the body 64 is connected to dome-shaped valve element 66 which has its open face directed downwardly with the peripheral edge 68 being somewhat thinner than the similar edge in the dome-shaped element 38 in FIG. 1. Additionally, the inner surface adjacent the peripheral edge 68 is provided with an annular shaped reinforcement 70 to provide increased back pressure whereby the valve may act as a relief valve.

Figure 5:
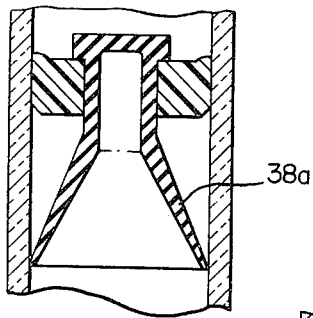

The embodiment illustrated in FIG. 5 is similar to that shown in FIG. 3 except that the dome-shaped portion 38 of the valve of FIG. 2 is replaced by a cone-shaped portion 38a.

In order to make certain that obstructions or a shoulder such as 56 in the pipe will not close off retainer opening 26 or longitudinal holes 27 in the retainer side portion and thus block off flow through the valve, the retainer may be provided with a projection 17 extending upwardly from the top face of the retainer.

I claim:

1. A two piece check valve assembly adapted for positioning within a tubular member for controlling flow in one direction therethrough, said check valve assembly comprising:

a retainer of resilient material having a cylindrical body including a top and bottom connected by a vertical side wall, gripping means on the vertical side wall for engaging the wall of the tubular member to retain the check valve assembly in position within said tubular member, said body having a vertical hole extending longitudinally therethrough on the axis of the body, an arcuate cutout portion extending from the vertical wall inwardly and connecting with the aforesaid hole to provide access for the valve when assembled with the retainer, a valve member of resilient material having a hollow cylindrical body portion, a cap formed on the top of the body to close off that end, said cap having a peripheral flange extending outwardly beyond the body portion, a dome-shaped valve element connected to the lower end of the valve body with the open face of the dome directed downwardly, said dome-shaped valve element having an opening in its dome sized and aligned with the hollow in the valve body, the dome-shaped valve element being sized such that its outer and largest portion will engage the wall of the tubular member in which the valve is carried, the valve element being assembled with the retainer by introducing the body of the valve element into the arcuate opening in the retainer body and moving same inwardly until said body is snugly positioned in the vertical hole in the body, whereby when the valve assembly is introduced into the tubular member the retainer will grip the wall of the tubular member with the valve element facing downwardly whereby when pressure is exerted on the inner surface of the dome-shaped valve element said valve element will snugly engage the wall of the tubular member to prevent flow therepast.

2. The invention as set forth in claim 1 and wherein the gripping means on the vertical side wall of the retainer are barb members adapted to engage the inner wall of the tubular member.

3. The invention as set forth in claim 2 and wherein the retainer body is provided with additional longitudinal openings to increase flow past the valve assembly.

4. The invention as set forth in claim 1 and wherein the valve body is solid and its lower end is connected to the dome-shaped valve element.

5. The invention as set forth in claim 4 and wherein the peripheral edge of the dome-shaped valve element is tapered down to a fine flexible edge to assist in valve action in both directions.

6. The invention as set forth in claim 1 and wherein the dome-shaped valve element is cone-shaped with the larger open end at the lower end of the valve element, said lower end of the valve element being adapted to engage the wall of the tubular member.

\* \* \* \* \*